(12) United States Patent
Nagano et al.

(10) Patent No.: US 11,057,974 B2
(45) Date of Patent: Jul. 6, 2021

(54) POWER SUPPLY DEVICE

(71) Applicant: OMRON Corporation, Kyoto (JP)

(72) Inventors: Masaaki Nagano, Kusatsu (JP); Koji Takatori, Kusatsu (JP); Yasutsugu Namura, Yasu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/643,826

(22) PCT Filed: Nov. 19, 2018

(86) PCT No.: PCT/JP2018/042609
§ 371 (c)(1),
(2) Date: Mar. 2, 2020

(87) PCT Pub. No.: WO2019/111685
PCT Pub. Date: Jun. 13, 2019

(65) Prior Publication Data
US 2021/0068230 A1     Mar. 4, 2021

(30) Foreign Application Priority Data

Dec. 5, 2017    (JP) .............................. JP2017-233487

(51) Int. Cl.
    *H05B 45/37*       (2020.01)
    *H05B 47/105*      (2020.01)
    *H05B 45/40*       (2020.01)
(52) U.S. Cl.
    CPC ............. *H05B 45/37* (2020.01); *H05B 45/40* (2020.01); *H05B 47/105* (2020.01)

(58) Field of Classification Search
None
See application file for complete search history.

(56) References Cited

U.S. PATENT DOCUMENTS 4,307,606 A    12/1981   Johnson
4,716,301 A    12/1987   Willmott et al.
(Continued)

FOREIGN PATENT DOCUMENTS

CN      103108441 A    5/2013
CN      204775062 U    11/2015
(Continued)

OTHER PUBLICATIONS

Sinha, Ashutosh Kumar; Blown Fuse Indicator, Oct. 5, 2017, pp. 1-2 (Year: 2017).*

(Continued)

*Primary Examiner* — Dedei K Hammond
(74) *Attorney, Agent, or Firm* — Metrolex IP Law Group, PLLC (57) ABSTRACT

A power supply device includes: an input unit; a power supply unit that generates a supply voltage from a voltage input through the input unit (10); an output unit; an LED that generates a first output in response to input of a voltage to input terminal, the LED being disposed between the input terminal—and the fuse; an LED that generates a second output in response to input of a voltage to the power supply unit through the fuse, the LED being disposed between the fuse and the power supply unit; and an LED that generates a third output in response to output from power supply unit, the LED being connected to an output terminal.

4 Claims, 9 Drawing Sheets

(56) References Cited

U.S. PATENT DOCUMENTS

| | | | |
|---|---|---|---|
| 7,902,761 B2 | 3/2011 | Ang et al. | |
| 8,680,784 B2 | 3/2014 | Hariharan | |
| 8,686,596 B2 | 4/2014 | Huss et al. | |
| 8,760,170 B2* | 6/2014 | McDiarmid | G01R 31/74 324/509 |
| 9,618,917 B2* | 4/2017 | Huang | G06F 1/00 |
| 2002/0047593 A1 | 4/2002 | Guthrie et al. | |
| 2005/0253533 A1 | 11/2005 | Lys et al. | |
| 2006/0002155 A1 | 1/2006 | Shteynberg et al. | |
| 2007/0205729 A1 | 9/2007 | Garbowicz et al. | |
| 2011/0062871 A1 | 3/2011 | Chen et al. | |
| 2011/0062888 A1 | 3/2011 | Bondy et al. | |
| 2011/0248640 A1 | 10/2011 | Welten | |
| 2012/0194077 A1 | 8/2012 | Wei et al. | |
| 2012/0286940 A1 | 11/2012 | Carmen, Jr. et al. | |
| 2013/0076248 A1 | 3/2013 | Shimizu et al. | |
| 2013/0113382 A1 | 5/2013 | Kitahara et al. | |
| 2018/0302963 A1 | 10/2018 | Fu et al. | |
| 2020/0053846 A1* | 2/2020 | Nagano | H05B 45/37 |

FOREIGN PATENT DOCUMENTS

| | | |
|---|---|---|
| CN | 106097986 A | 11/2016 |
| CN | 205828339 U | 12/2016 |
| CN | 107230605 A | 10/2017 |
| CN | 107771414 A | 3/2018 |
| DE | 102005053298 A1 | 5/2007 |
| JP | S63-228973 A | 9/1988 |
| JP | H09-016274 A | 1/1997 |
| JP | 2005-151674 A | 6/2005 |
| JP | 2006-349626 A | 12/2006 |
| JP | 2007-109483 A | 4/2007 |
| JP | 2011-158350 A | 8/2011 |
| JP | 2017-158244 A | 9/2017 |
| KR | 10-0335190 B | 11/2002 |
| WO | 2016/202665 A1 | 12/2016 |

OTHER PUBLICATIONS

An English translation of the International Search Report("ISR") of PCT/JP2018/042609 dated Feb. 5, 2019.
The Written Opinion("WO") of PCT/JP2018/042609 dated Feb. 5, 2019.
The International Preliminary Report on Patentability (IPRP) Chapter II of the Patent Cooperation Treaty of PCT/JP2018/042609 dated Oct. 1, 2019.
The Taiwanese Office Action dated Jun. 14, 2019 in a counterpart Taiwanese patent application.
The Notice of Last Preliminary Rejection dated Nov. 25, 2020 in a Korean patent application.
The Office Action dated Jul. 21, 2020 in a European patent application.
The Office Action dated May 18, 2020 in a Korean patent application.
The extended European search report (EESR) dated Oct. 14, 2019 in a European Patent application.
The Office Action dated Sep. 10, 2020 in a U.S. patent application.
The Office Action dated Mar. 13, 2020 in a U.S. patent application.
The Office Action dated Aug. 22, 2019 in a U.S. patent application.
Office Action (CNOA) dated Feb. 9, 2021 in a related Chinese patent application.
Notice of Allowance and Fee(s) Due dated Jan. 27, 2021 in a related U.S. Appl. No. 16/392,682.
Corrected Notice of Allowability and List of References cited by applicant and considered by examiner dated Feb. 8, 2021 in a related U.S. Appl. No. 16/392,682.
Corrected Notice of Allowability and List of References cited by applicant and considered by examiner dated Mar. 25, 2021 in a related U.S. Appl. No. 16/392,682.
Anonymous, "4 LED voltage indicator circuits—ElecCircuit.com", Aug. 10, 2017, Retrieved from the Internet: URL: https://web.archive.org/web/20170810212352/http://www.eleccircuit.com/simple-voltage-indicator-by-led-and-zener-diode/, Retrieved on Mar. 18, 2021, XP55787229; Relevance is indicated in the Summons to attend oral proceedings pursuant to Rule 115(1) EPC dated Mar. 25, 2021.
Summons to attend oral proceedings pursuant to Rule 115(1) EPC dated Mar. 25, 2021 in a related European patent application.

\* cited by examiner

| PATTERN | INPUT 1 | INPUT 2 | OUTPUT 1 | INTERNAL STATE OF POWER SUPPLY |
|---|---|---|---|---|
| 1 | ON | ON | ON | NORMAL STATE |
| 2 | ON | ON | OFF | OUTPUT IS SHORT-CIRCUITED/ SECONDARY SIDE FAILURE |
| 3 | ON | OFF | ON | [NO SUCH A STATE] |
| 4 | ON | OFF | OFF | FUSE BLOWOUT (PRIMARY SIDE FAILURE) |
| 5 | OFF | ON | ON | [NO SUCH A STATE] HOLD TIME |
| 6 | OFF | ON | OFF | [NO SUCH A STATE] |
| 7 | OFF | OFF | ON | EXTERNAL APPLICATION OF VOLTAGE |
| 8 | OFF | OFF | OFF | NO INPUT VOLTAGE |

FIG.4

| PATTERN | INPUT 1 | INPUT 2 | OUTPUT 1 | INTERNAL STATE OF POWER SUPPLY |
|---|---|---|---|---|
| 1 | ON | ON | ON | NORMAL STATE |
| 2 | ON | ON | OFF | OUTPUT IS SHORT-CIRCUITED/ SECONDARY SIDE FAILURE |
| 3 | ON | OFF | ON | [NO SUCH A STATE] |
| 4 | ON | OFF | OFF | FUSE BLOWOUT (PRIMARY SIDE FAILURE) |
| 5 | OFF | ON | ON | HOLD TIME/INPUT VOLTAGE DECREASED |
| 6 | OFF | ON | OFF | INPUT VOLTAGE DECREASED (OPERATING STOP VOLTAGE OR LOWER) |
| 7 | OFF | OFF | ON | EXTERNAL APPLICATION OF VOLTAGE |
| 8 | OFF | OFF | OFF | NO INPUT VOLTAGE |

FIG.5

| PATTERN | INPUT 1 | INPUT 2 | OUTPUT 1 | INTERNAL STATE OF POWER SUPPLY |
|---|---|---|---|---|
| 1 | ON | ON | ON | NORMAL STATE |
| 2 | ON | ON | OFF | OUTPUT IS SHORT-CIRCUITED/ SECONDARY SIDE FAILURE |
| 3 | ON | OFF | ON | INPUT VOLTAGE DECREASED |
| 4 | ON | OFF | OFF | FUSE BLOWOUT (PRIMARY SIDE FAILURE) |
| 5 | OFF | ON | ON | HOLD TIME/INPUT VOLTAGE DECREASED |
| 6 | OFF | ON | OFF | INPUT VOLTAGE DECREASED (OPERATING STOP VOLTAGE OR LOWER) |
| 7 | OFF | OFF | ON | EXTERNAL APPLICATION OF VOLTAGE |
| 8 | OFF | OFF | OFF | NO INPUT VOLTAGE |

| PATTERN | INPUT 1 | INPUT 2 | INPUT 3 | OUTPUT 1 | INTERNAL STATE OF POWER SUPPLY |
|---|---|---|---|---|---|
| 1 | ○ | ○ | ○ | ○ | NORMAL STATE |
| 2 | ○ | ○ | ○ | × | OUTPUT IS SHORT-CIRCUITED |
| 3 | ○ | ○ | × | ○ | EXTERNAL APPLICATION OF VOLTAGE |
| 4 | ○ | ○ | × | × | PROTECTION FUNCTION, SUCH AS OVERVOLTAGE PROTECTION, TRIGGERED |
| 5 | ○ | × | × | × | FUSE DISCONNECT |
| 6 | × | × | ○ | ○ | POSSIBILITY OF MOMENTARY POWER INTERRUPTION |
| 7 | × | × | × | × | NO INPUT VOLTAGE |
| 8 | OTHER COMBINATION | | | | ANOMALY STATE IS TAKING PLACE |

POWER SUPPLY DEVICE

TECHNICAL FIELD

The present invention relates to a power supply device.

BACKGROUND ART

For example, Japanese Patent Laying-Open No. 2006-349626 (PTL 1) discloses a mount circuit having a configuration which allows a user to readily find an anomaly, such as a reduction in supply voltage. The mount circuit includes an LED element for monitoring the state of the supply voltage and an illumination control circuit for the LED element. The illumination control circuit turns the LED element on if the supply voltage is greater than or equal to a given voltage. The illumination control circuit turns the LED element off if the supply voltage is less than the given voltage.

CITATION LIST

Patent Literature

PTL 1: Japanese Patent Laying-Open No. 2006-349626

SUMMARY OF INVENTION

Technical Problem

According to the above configuration, a user can ascertain the state of output of the power supply device. However, in the event of an anomaly in a circuit included in the power supply device, the circuit needs to be inspected with a measuring instrument, such as a tester, in order to identify the cause of the anomaly.

An object of the present invention is to provide a power supply device which allows a user to readily confirm the internal state of the power supply device.

Solution to Problem

According to one example of the present disclosure, a power supply device includes: an input unit which includes an input terminal and a protection circuit connected to the input terminal; a power supply unit that generates a supply voltage from a voltage input through the input unit; an output unit which includes an output terminal which outputs the supply voltage; a first output circuit that generates a first output in response to input of a voltage to the input terminal, the first output circuit being disposed between the input terminal and the protection circuit; a second output circuit that generates a second output in response to input of a voltage to the power supply unit through the protection circuit, the second output circuit being disposed between the protection circuit and the power supply unit; and a third output circuit that generates a third output in response to output from the power supply unit, the third output circuit being connected to the output terminal.

According to the above configuration, the power supply device can be provided which allows a user to readily confirm the internal state of the power supply device. The user is allowed to confirm an anomaly with respect to input of the power supply device from the first output from the first output circuit. The user is allowed to confirm whether the protection circuit is operating normally from the second output from the second output circuit. The user is allowed to confirm whether the power supply unit is operating normally from the third output from the third output circuit. Note that the form of "output" is not particularly limited, and may be an electrical output or a light output, for example.

In the power supply device, the first output circuit, the second output circuit, and the third output circuit are light-emitting circuits, and the first output, the second output, and the third output are light outputs.

According to the above configuration, the state of the power supply device can be notified outside the power supply device. The type of the light-emitting circuit is not particularly limited.

In the power supply device, the power supply unit includes: a transformer having a primary winding, an auxiliary winding, and a secondary winding; a switching element connected to the primary winding of the transformer; and a drive control circuit that receives a voltage across the auxiliary winding of the transformer and drives the switching element, the power supply device further comprising a fourth output circuit that outputs a fourth signal indicating whether the voltage across the auxiliary winding is normal.

According to the above configuration, the power supply device can be provided which allows a user to readily confirm the operative state of the power supply unit. For example, when a multiple number of the power supply devices are used to drive the load, the load can be driven by all the power supply devices if no difference is caused in output voltage between the power supply devices. In contrast, if differences are caused in output voltage between the power supply devices, the operation of a power supply device, whose output voltage is low, stops. In other words, the power supply unit is deactivated. Accordingly, a user can readily confirm the power supply device in operation and the deactivated power supply device.

In the above power supply device, the fourth output circuit is a light-emitting circuit and the fourth output is a light output.

According to the above configuration, the state of the power supply device can be notified outside the power supply device.

The power supply device further includes a display circuit that displays information regarding a state of the power supply device, based at least on the first output, the second output, and the third output.

According to the above configuration, a user can ascertain the state of the power supply device from the information (e.g., an error code) displayed on the display circuit. The type of the display circuit is not limited.

Advantageous Effects of Invention

According to one example of the present disclosure, the power supply device can be provided which allows a user to readily confirm the internal state of the power supply device.

DESCRIPTION OF EMBODIMENTS

In the following, the present embodiment will be described in detail, with reference to the accompanying drawings. Note that like reference signs are used to refer to like or corresponding parts in the drawings.

§ 1 Application

Figure 1:
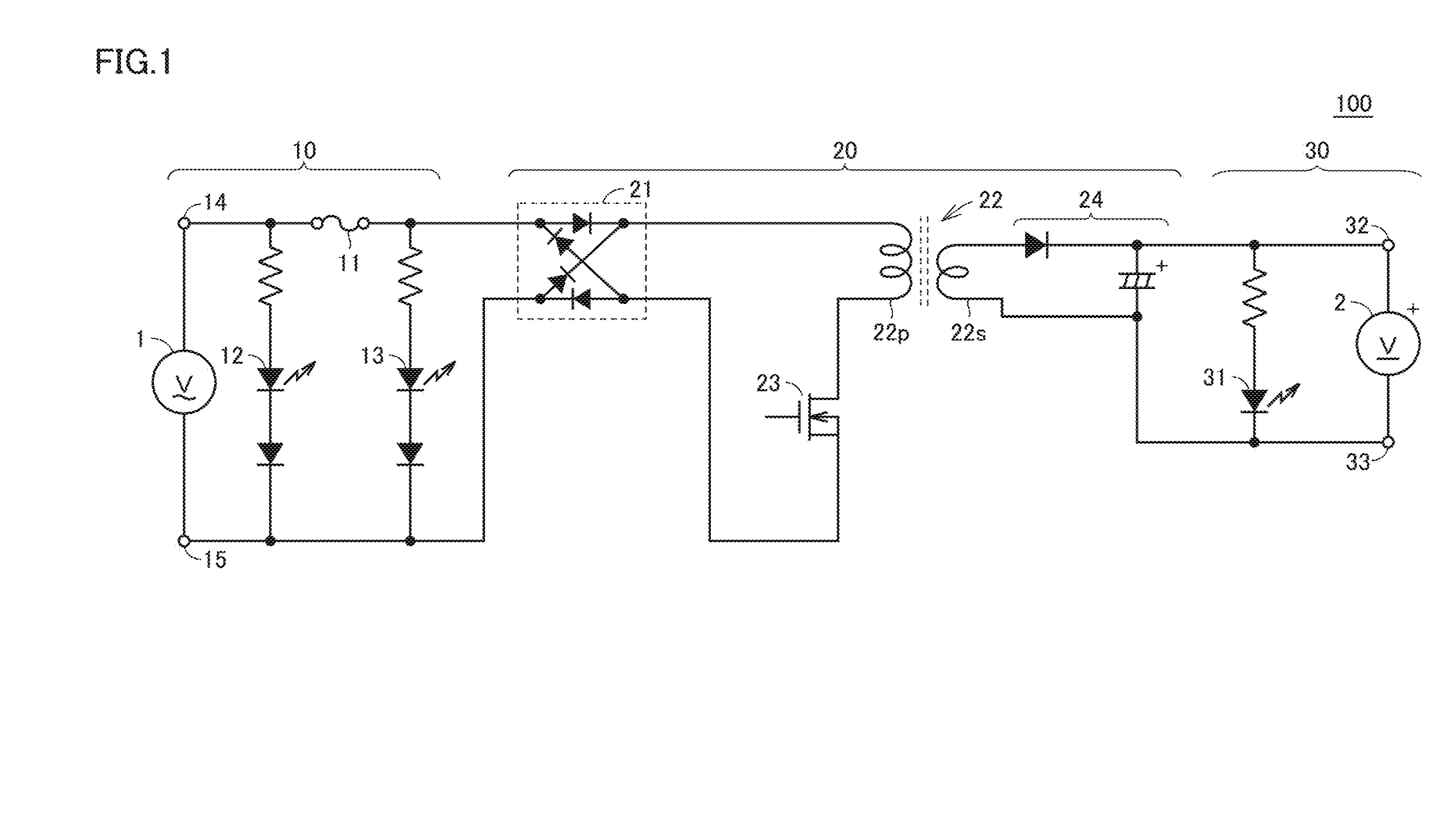
FIG. 1 is a circuit diagram showing a schematic configuration of a power supply device 100 according to an embodiment of the present disclosure.

Initially, referring to FIG. 1, one example scenario to which the present invention is applied will be described. FIG. 1 is a circuit diagram showing a schematic configuration of a power supply device 100 according to the present embodiment. Note that, in the description below, "connect" is not limited to direct connection and encompasses indirect connection via an element.

As shown in FIG. 1, power supply device 100 is a switching power supply device, for example. Power supply device 100 includes an input unit 10, a power supply unit 20, and an output unit 30.

For example, input unit 10 is connected to an alternating-current (AC) power supply (e.g., a commercial power supply at 50 Hz/60 Hz and 100 V/200 V) 1. Input unit 10 includes input terminals 14, 15, and a fuse 11 connected to input terminal 14. Fuse 11 is one example of a protection circuit according to the present embodiment.

Power supply unit 20 generates a supply voltage from a voltage input thereto through input unit 10. As one example, power supply unit 20 includes a rectifier circuit 21, a transformer 22, a MOSFET 23 as a switching element, and a rectifier/smoothing circuit 24. Details of power supply unit 20 will be described below.

Output unit 30 outputs a supply voltage generated by power supply unit 20. Output unit 30 includes output terminals 32, 33. In the configuration shown in FIG. 1, a direct-current (DC) voltage is output as the supply voltage. In order to represent the output of the DC voltage, output unit 30 is connected to a virtual DC power supply 2 in FIG. 1.

Power supply device 100 further includes LED 12, LED 13, and LED 31. LED 12 is one example of a first output circuit. The first output circuit is disposed between input terminal 14 and fuse 11 and generates a first output in response to input of a voltage to input terminal 14. LED 13 is one example of a second output circuit. The second output circuit is disposed between fuse 11 and power supply unit 20 and generates a second output in response to input of a voltage to power supply unit 20 through fuse 11. LED 31 is one example of a third output circuit. The third output circuit is connected to output terminals 32, 33 and generates a third output in response to output from power supply unit 20. In the example shown in FIG. 1, the "first output," "second output," and "third output" are, all, light outputs.

Note that a resistor and a diode are connected in series with each of LEDs 12, 13 in the example shown in FIG. 1. A resistor is connected in series with LED 31. However, the present disclosure is not limited such a configuration. LED 12 is on when AC power is input to input unit 10. LED 13 is on when fuse 11 is operating normally. LED 31 is on when DC power is output from output unit 30.

Suppose that LEDs 12, 13 are omitted and only LED 31 is included in power supply device 100. In the event of LED 31 being turned off, there is no way of knowing, without the use of a measuring instrument such as a tester, whether no alternating current is input to input unit 10 or fuse 11 is blown. According to the present embodiment, a user is allowed to visually confirm the internal state of the power supply device 100 and the state of the input voltage from the combination of on and off of LED 12, LED 13, and LED 31. Accordingly, a power supply device can be implemented which allows the user to readily confirm the internal state of the power supply device.

§ 2 Example Configuration

Figure 2:
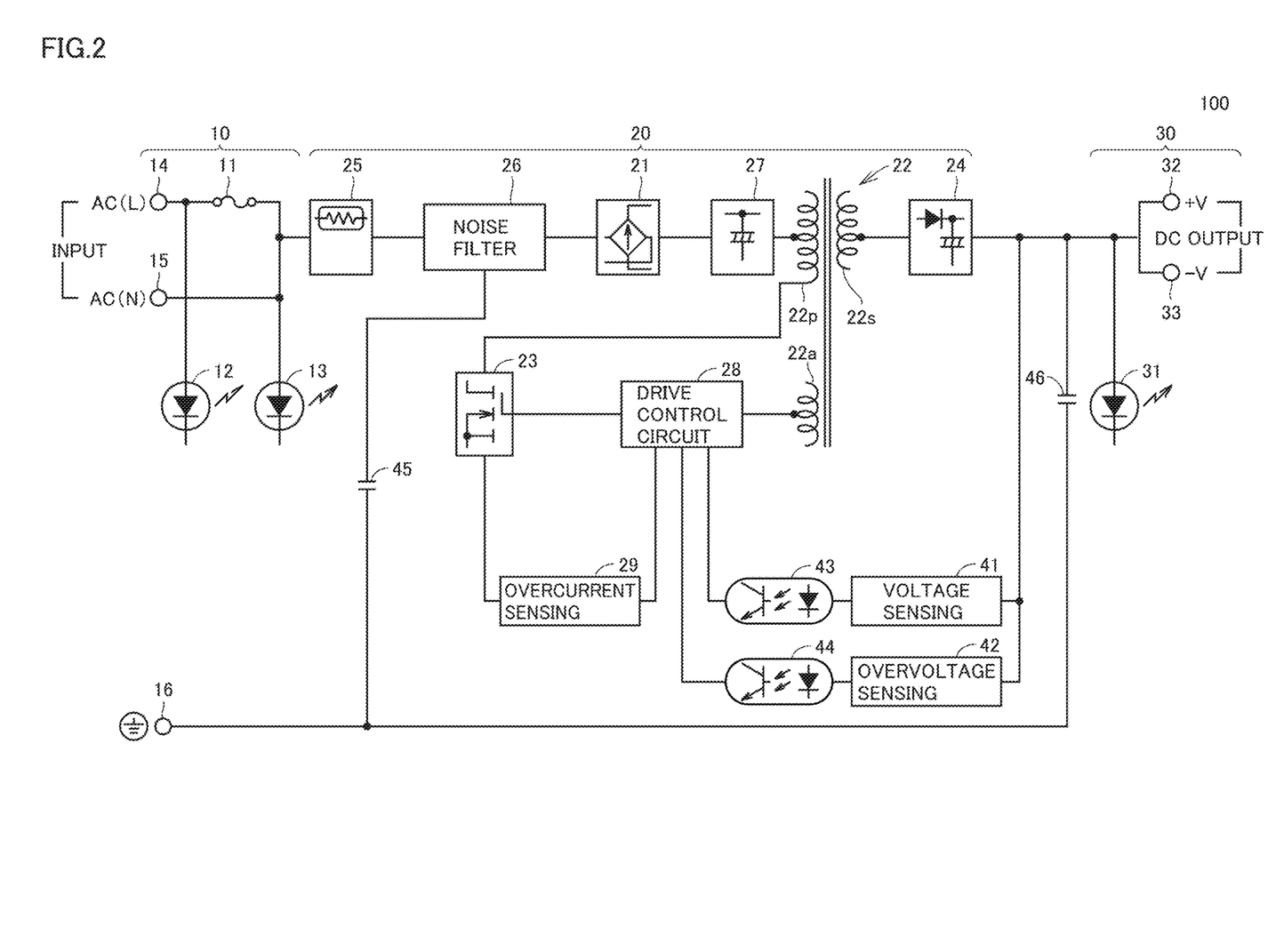
FIG. 2 is a block diagram showing one example configuration of power supply device 100 of FIG. 1.

FIG. 2 is a block diagram showing one example configuration of power supply device 100 of FIG. 1. An AC voltage is input to input terminals 14, 15 (INPUT). An input terminal 16 is a ground terminal.

In addition to the elements shown in FIG. 1, power supply unit 20 includes an inrush current-limiting circuit 25, a noise filter 26, a smoothing circuit 27, a drive control circuit 28, an overcurrent sensing circuit 29, a voltage sensing circuit 41, an overvoltage sensing circuit 42, a photocoupler 43, a photocoupler 44, and capacitors 45, 46.

Inrush current-limiting circuit 25 is configured of, for example, a resistor and a relay inserted in parallel with the resistor. The relay opens for tens of milliseconds since activation of power supply device 100 to prevent inrush current, after which the relay closes and power supply unit 20 is activated.

Noise filter 26 filters a high-frequency noise component superimposed on the AC voltage input to INPUT, and supplies rectifier circuit 21 with the AC voltage having the noise component removed therefrom. Smoothing circuit 27 is configured of a smoothing capacitor. Smoothing circuit 27 smooths the full-wave rectified voltage.

Transformer 22 includes a primary winding 22$p$, a secondary winding 22$s$, and an auxiliary winding 22$a$. Transformer 22 induces a high-frequency pulse voltage across primary winding 22$p$ to secondary winding 22$s$ and auxiliary winding 22$a$. The high-frequency pulse voltage induced to secondary winding 22$s$ is utilized for DC output. The high-frequency pulse voltage induced to auxiliary winding 22$a$ is utilized to activate the drive control circuit 28.

Rectifier/smoothing circuit 24 is configured of a smoothing capacitor and a half-wave rectifier circuit formed of a diode. Rectifier/smoothing circuit 24 half-rectifies the high-frequency, pulsed power source (the AC power source) induced to secondary winding 22$s$ of transformer 22 to generate a DC output power source having specified output voltage and output current.

Voltage sensing circuit 41 detects the output voltage of the DC output power source by a corresponding step-down voltage. Photocoupler 43 outputs to drive control circuit 28 a signal corresponding to the detected step-down voltage. If the output voltage of the DC output power source exceeds a specified voltage, overvoltage sensing circuit 42 detects an overvoltage. Photocoupler 44 outputs to drive control circuit 28 a signal indicating the detection of overvoltage.

Drive control circuit 28 is configured of an control IC which includes a PWM (Pulse Width Modulation) signal generator, a feedback control circuit, an OCP (Over Current Protect) terminal, a switching drive terminal, a drive power supply terminal, etc. Drive control circuit 28 supplies a PWM signal to the gate of MOSFET 23 to drive MOSFET 23.

The secondary-side voltage, which is detected by voltage sensing circuit 41, is fed back to drive control circuit 28 via photocoupler 43. Drive control circuit 28 changes the duty ratio of the PWM signal based on the voltage fed back, and drives MOSFET 23 so that the supply voltage, which is the output voltage of the DC output power source, is the specified voltage.

MOSFET 23 is connected in series with primary winding 22p of transformer 22. In response to the PWM signal supplied from drive control circuit 28, MOSFET 23 interrupts the primary-side voltage to cause primary winding 22p of transformer 22 to generate a high-frequency, pulsed power source. The supply voltage generated by power supply unit 20 is output through output terminals 32, 33 (DC OUTPUT).

Figure 3:
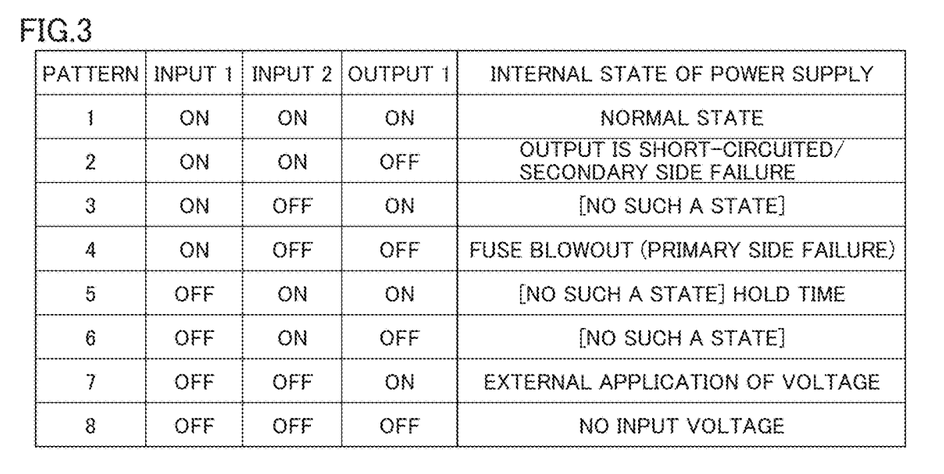
FIG. 3 is a diagram illustrating patterns of illumination of LEDs according to one embodiment.

FIG. 3 is a diagram illustrating patterns of illumination of LEDs, according to one embodiment. The "input 1," "input 2," and "output 1," indicated in FIG. 3, respectively represent LED 12, LED 13, and LED 31.

Note that FIG. 3 illustrates all patterns of illumination of the LEDs. As illustrated in FIG. 3, LEDs 12, 13, 31 each have two states, on or off. Accordingly, 2×2×2=8 different patterns exist as a whole. Each LED is on when there is input of voltage, and off when not voltage is input.

Pattern 1 is a pattern in which input 1, input 2, and output 1 are all on, indicating that power supply device 100 is operating normally. Power supply device 100 is in the normal state.

Pattern 2 is a pattern in which input 1 and input 2 are on and output 1 is off, indicating that there is an anomaly on the secondary side of power supply unit 20 (e.g., there may be a short circuit on the output side, a failure on the secondary side, etc.).

Pattern 3 is a pattern in which input 1 and output 1 are on and input 2 is off. However, the internal state of the power supply device 100 that corresponds to such a pattern does not exist.

Pattern 4 is a pattern in which input 1 is on and input 2 and output 1 are off. Pattern 4 represents that there is an anomaly, such as blowout of fuse 11, a failure on the primary side of power supply unit 20, etc.

Pattern 5 is a pattern in which input 1 is off and input 2 and output 1 are on. Pattern 5 represents that power supply device 100 is in hold time. In practice, such a state may not take place.

Pattern 6 is a pattern in which input 1 and output 1 are off and input 2 is on. However, the internal state of the power supply device 100 that corresponds to such a pattern does not exist.

Pattern 7 is a pattern in which input 1 and input 2 are off and output 1 is on. Such a state can take place if, for example, a voltage external to power supply device 100 is applied to power supply device 100.

Pattern 8 is a pattern in which input 1, input 2, and output 1 are all off, indicating that there is no input voltage.

A certain threshold may exist for the voltage for switching input 1 between on/off. In other words, input 1 is on if the input voltage exceeds the threshold, and input 1 is off if the input voltage is less than or equal to the threshold. A correspondence between patterns of illumination of the LEDs according to such conditions and the internal states of the power supply device 100 will be described, with reference to FIG. 4.

Figure 4:
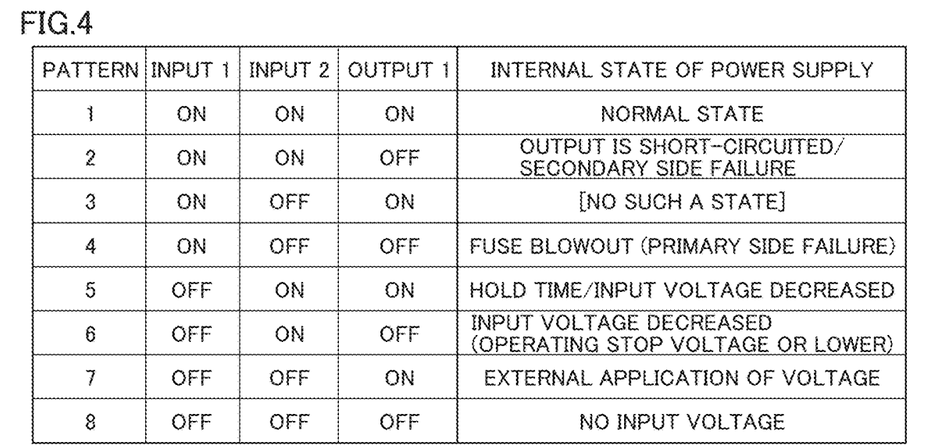
FIG. 4 is a diagram illustrating patterns of illumination of the LEDs when lighting conditions for an input 1 has a threshold.

FIG. 4 is a diagram illustrating patterns of illumination of the LEDs when lighting conditions for input 1 has a threshold. As illustrated in FIG. 4, the internal states of the power supply device 100 that correspond to patterns 5 and 6 are different from the example illustrated in FIG. 3. Specifically, pattern 5 (input 1 is off and input 2 and output 1 are on) indicates that power supply device 100 is in hold time or the input voltage of power supply device 100 has decreased. Pattern 6 (input 1 and output 1 are off and input 2 is on) indicates that the input voltage has decreased less than or equal to an operating stop voltage.

Similarly, a certain threshold may exist for the voltage for switching input 2 between on/off. In other words, input 2 is on if the input voltage exceeds the threshold, and input 2 is off if the input voltage is less than or equal to the threshold. A correspondence between patterns of illumination of the LEDs according to such conditions and the internal states of the power supply device 100 will be described, with reference to FIG. 5.

Figure 5:
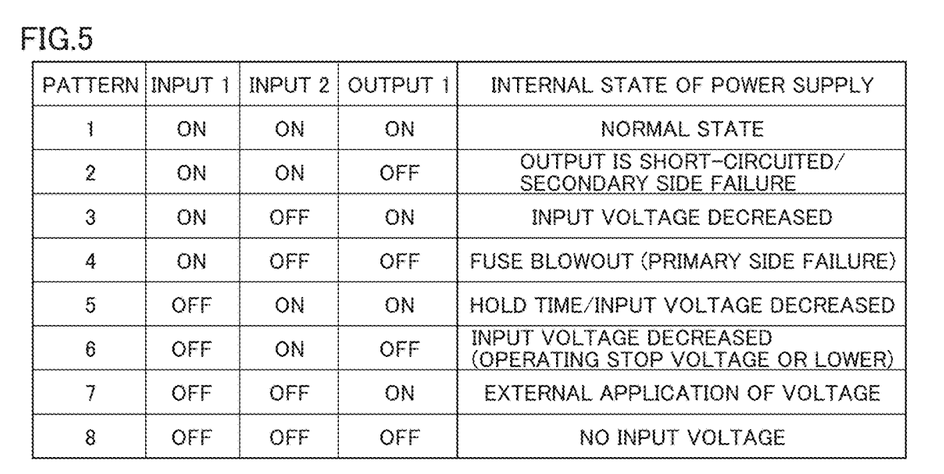
FIG. 5 is a diagram illustrating patterns of illumination of the LEDs when lighting conditions for an input 2 has a threshold.

FIG. 5 is a diagram illustrating patterns of illumination of the LEDs when lighting conditions for input 2 has a threshold. As illustrated in FIG. 5, the internal state of the power supply device 100 that corresponds to pattern 3 is different from the example illustrated in FIG. 4. In the example shown in FIG. 5, pattern 3 (input 1 and output 1 are off and input 2 is on) indicates that the input voltage of power supply device 100 has decreased.

Figure 6:
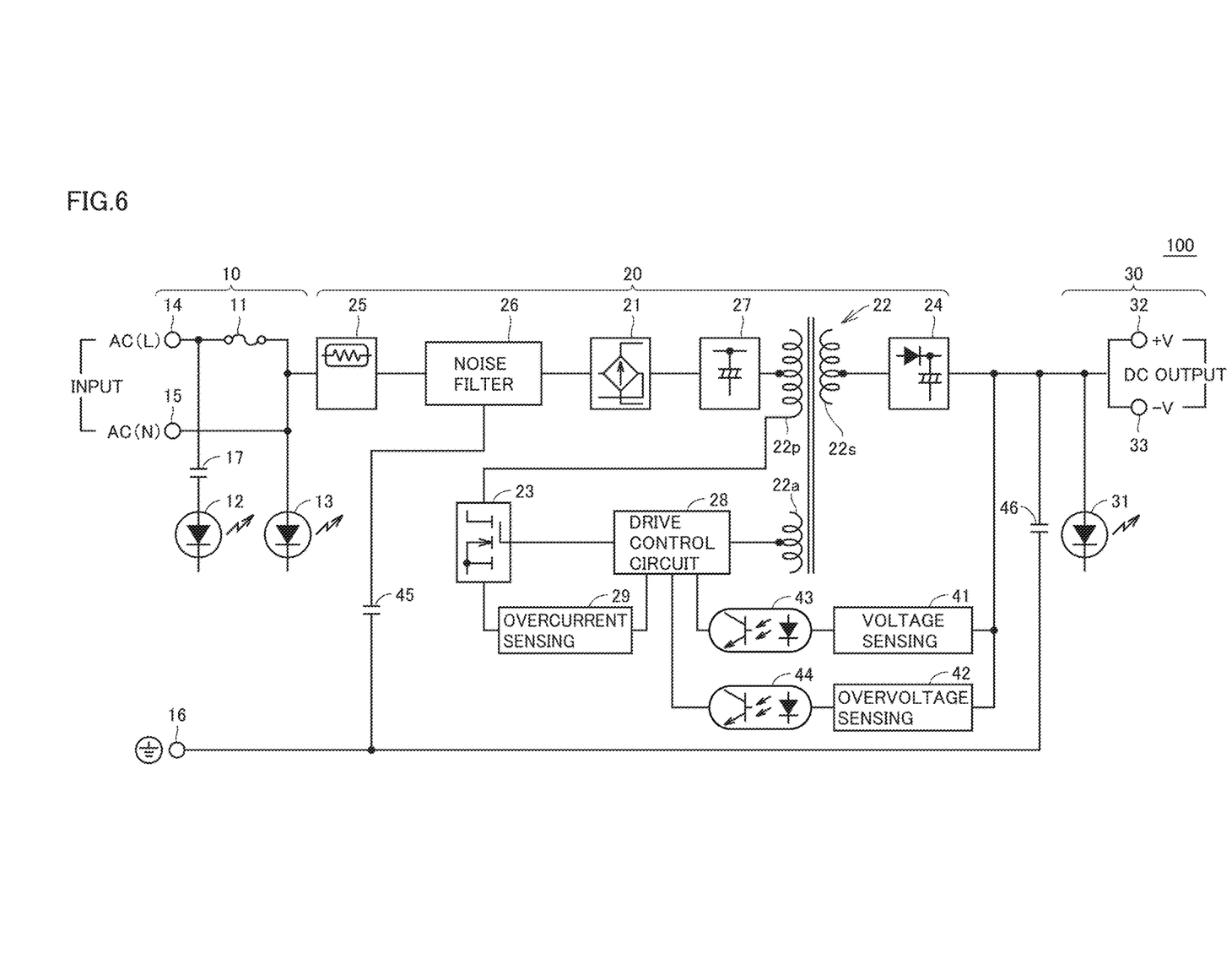
FIG. 6 is a diagram showing another example configuration of power supply device 100 according to the embodiment of the present disclosure.

The configuration of power supply device 100 according to the present embodiment is not limited to the above. FIG. 6 is a diagram showing another example configuration of power supply device 100 according to the present embodiment. As shown in FIG. 6, an input capacitor 17 may be added to input unit 10. Input capacitor 17 is connected between the input terminal and LED 12. This allows the user to confirm whether a direct current is input to input unit 10 or an alternating current is input to input unit 10. The rest of the configuration of power supply device 100 shown in FIG. 6 is the same as the corresponding portion of the configuration shown in FIG. 2.

Moreover, multiple power supply devices 100 may be setup and the parallel operation may be performed. According to the present embodiment, the user is allowed to confirm for each of the multiple power supply devices 100 whether power supply device 100 is in operation or deactivated. A configuration for this will be described below.

Figure 7:
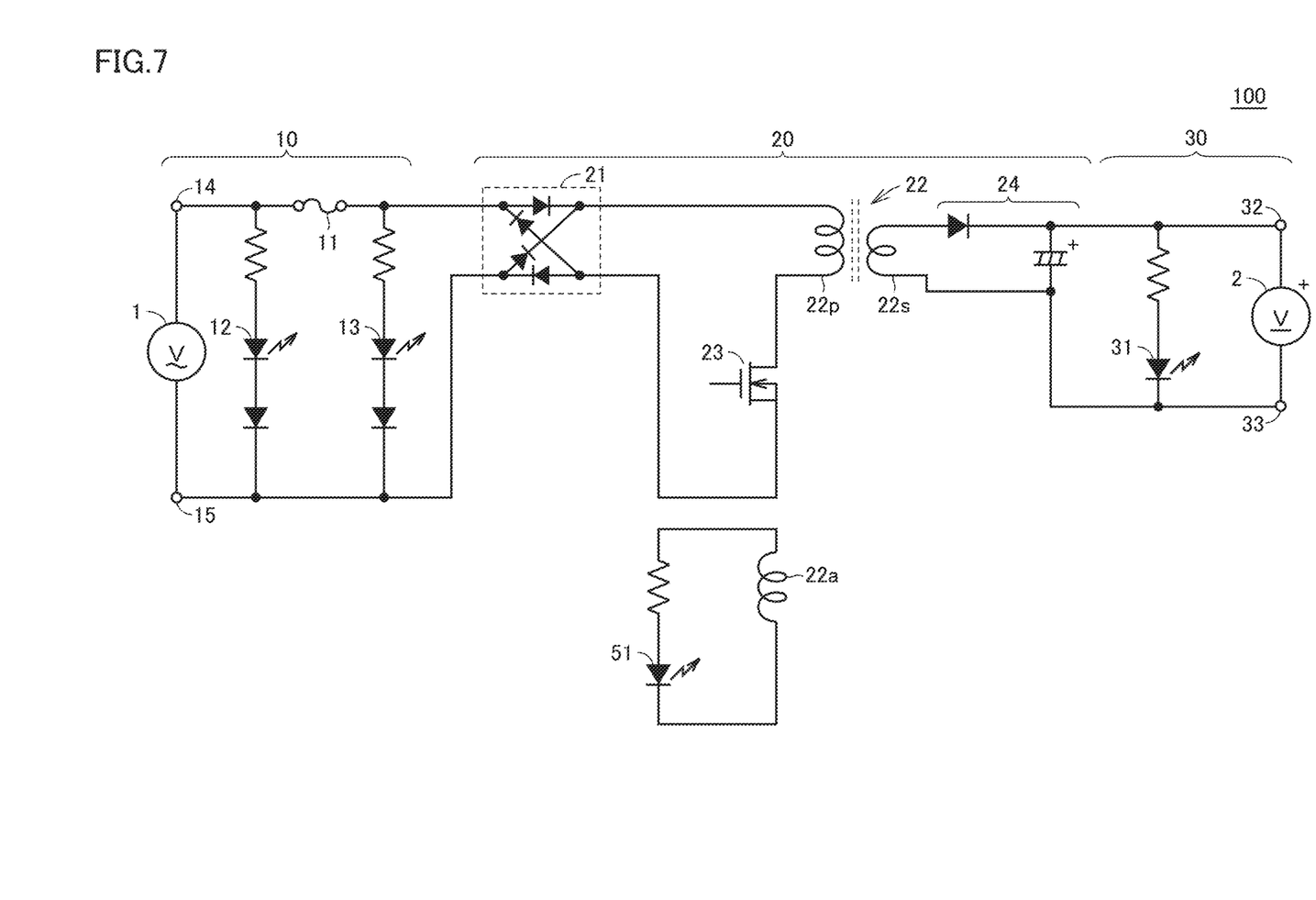
FIG. 7 is a circuit diagram showing still another example configuration of power supply device 100 according to the embodiment of the present disclosure.
Figure 8:
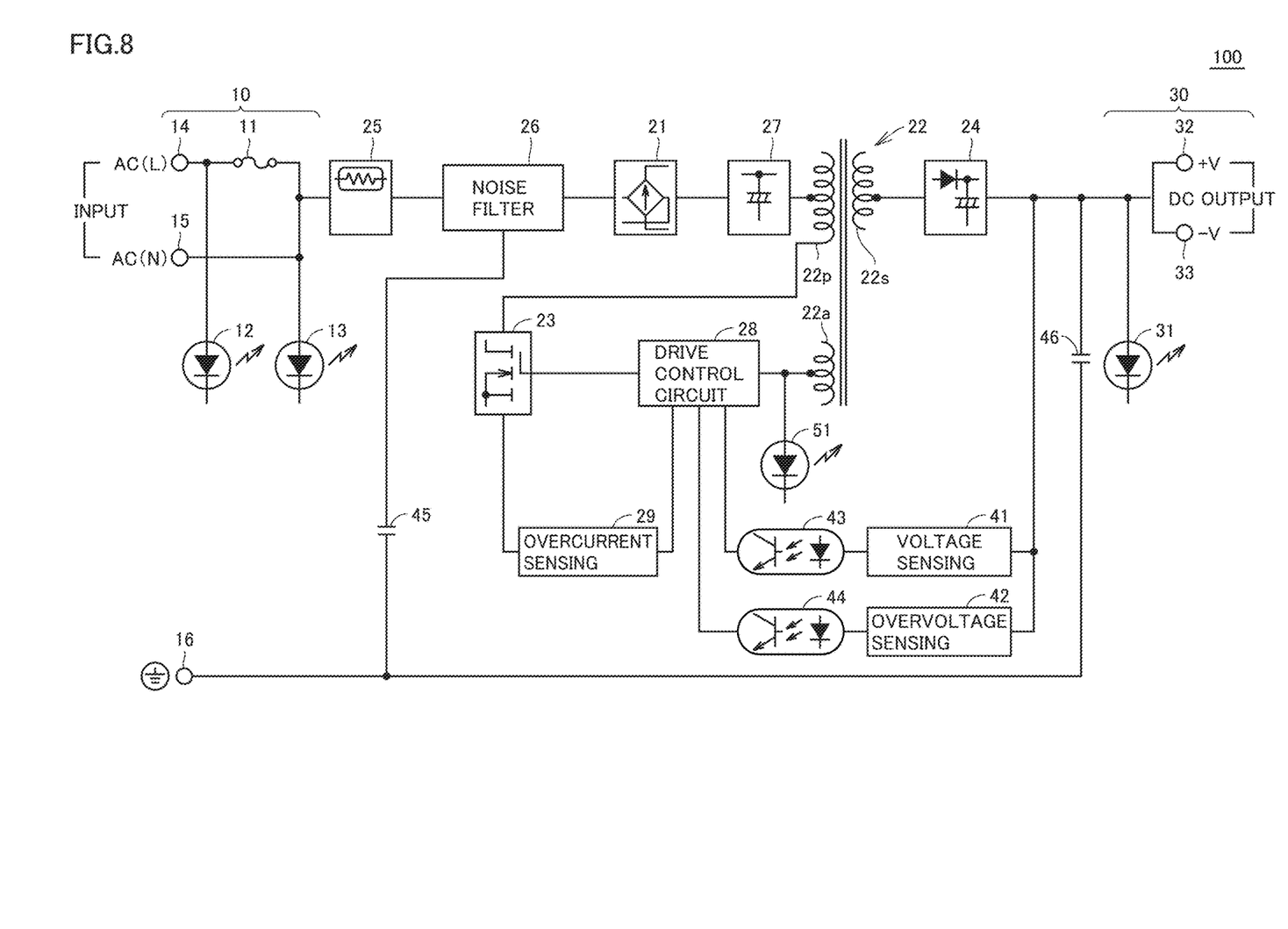
FIG. 8 is a block diagram showing one example configuration of power supply device 100 of FIG. 7.

FIG. 7 is a circuit diagram showing still another example configuration of power supply device 100 according to the present embodiment. FIG. 8 is a block diagram showing one example configuration of power supply device 100 shown in FIG. 7. As shown in FIGS. 7 and 8, power supply device 100 includes an LED 51 connected to auxiliary winding 22a of transformer 22. LED 51 is one example of a "fourth display circuit" according to the present embodiment.

Figure 9:
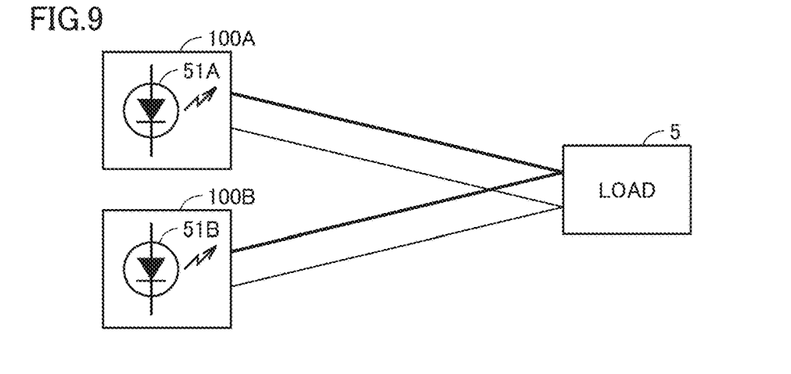
FIG. 9 is a schematic diagram schematically illustrating parallel operation by multiple power supply devices 100.

FIG. 9 is a schematic diagram schematically showing parallel operation by multiple power supply devices 100.

For example, suppose that two power supply devices 100A, 100B are connected in parallel with a load 5. In this case, the output voltage needs to be set for each of power supply devices 100A, 100B so that there is no difference in output voltage between power supply devices 100A, 100B.

Figure 10:
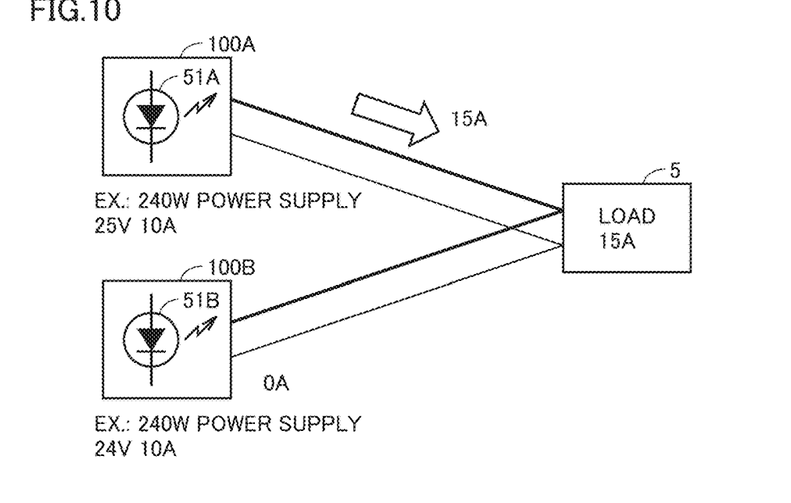
FIG. 10 is a schematic diagram illustrating the parallel operation by multiple power supply devices 100 while a difference is caused in output voltage.

FIG. 10 is a schematic diagram showing the parallel operation by multiple power supply devices 100 while a difference is caused in output voltage between power supply devices 100. If a difference is caused in output voltage between power supply devices 100A, 100B, the output to load 5 is provided by the power supply device at a higher voltage. For example, suppose that power supply devices 100A, 100B are both a 240 W power supply, and the output voltage of power supply device 100A is 25 V whereas the output voltage of power supply device 100B is 24 V. In this case, a current (e.g., 15A) is supplied to load 5 only from power supply device 100A. In contrast, the switching operation of power supply device 100B is stopped. LED 51A included in power supply device 100A is on. In contrast, LED 51B included in power supply device 100B is off. Accordingly, the user is allowed to ascertain that power supply device 100B is not operating.

Figure 11:
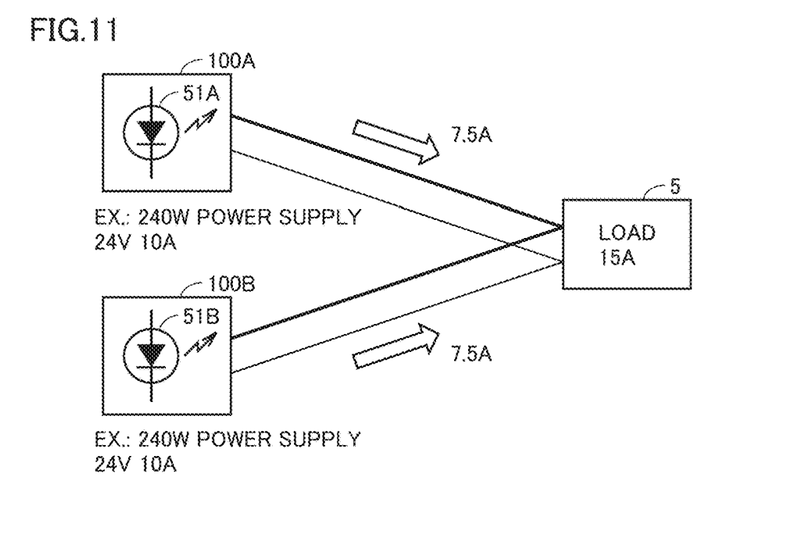
FIG. 11 is a schematic diagram illustrating the parallel operation by multiple power supply devices 100 while no difference is caused in output voltage.

FIG. 11 is a schematic diagram showing the parallel operation by multiple power supply devices 100 while no difference is caused in output voltage. The output voltage is set for each of power supply devices 100A, 100B so that no difference is caused in output voltage between power supply devices 100A, 100B. Each of power supply devices 100A, 100B can output a voltage while retaining the equality in output between power supply devices 100A, 100B. LED 51A included in power supply device 100A and LED 51B included in power supply device 100B are both on and the user is thus allowed to ascertain that both power supply devices 100A, 100B are in operation.

Note that, in the circuit structure shown in FIGS. 7 and 8, LED 12, LED 13, LED 31, and LED 51 may be replaced with photocouplers. Each photocoupler corresponds to an "output circuit" according to the present invention. Signals output from the photocouplers respectively correspond to the "first output," "second output," "third output," and "fourth output." These signals can be conveyed to the control circuit (e.g., CPU) of power supply device 100. The user is allowed to confirm, from the combination of the signals from the four photocouplers, which type of malfunction has occurred in power supply device 100.

Figure 12:
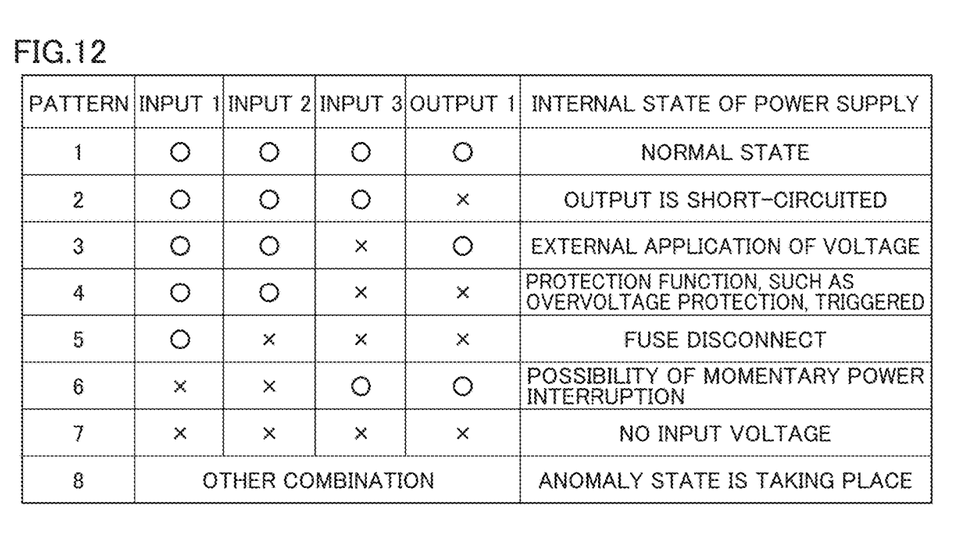
FIG. 12 is a diagram showing patterns of the combination of signals from four photocouplers.

FIG. 12 is a diagram showing patterns of the combination of the signals from the four photocouplers. The "input 1," "input 2," "input 3," and "output 1," indicated in FIG. 12, represent the photocouplers alternative to LED 12, LED 13, LED 51, and LED 31, respectively. The sign "○" in FIG. 12 represents that the photocoupler outputs a signal. The sign "x" represents that the photocoupler outputs no signal.

Pattern 1 is a pattern in which all the photocouplers, which are input 1, input 2, input 3, and output 1, output signals, indicating that power supply device 100 is operating normally. The internal state of the power supply device 100 is in the normal state.

Pattern 2 is a pattern in which input 1, input 2, and input 3 output signals and output 1 outputs no signal, representing that there is an anomaly on the secondary side of power supply unit 20, for example, a short circuit on the output side.

Pattern 3 is a pattern in which input 1, input 2, and output 1 output signals and input 3 outputs no signal. Such a state can take place if, for example, a voltage external to power supply device 100 is applied to power supply device 100.

Pattern 4 is a pattern in which input 1 and input 2 output signals and input 3 and output 1 output no signal. Pattern 5 represents that a protection function, for example, overvoltage protection, has been triggered.

Pattern 5 is a pattern in which input 1 outputs a signal and input 2, input 3, and output 1 output no signal. Pattern 5 represents an anomaly, such as blowout of fuse 11, a failure on the primary side of power supply unit 20, etc.

Pattern 6 is a pattern in which input 1 and input 2 output no signal and input 3 and output 1 output signals. Pattern 6 represents that momentary power interruption may have occurred in power supply device 100.

Pattern 7 is a pattern in which input 1, input 2, input 3, and output 1 output no signal. Such a state can take place if, for example, there is no voltage input to power supply device 100.

Pattern 8 is a pattern of a combination of signals, other than the combinations described above. An anomaly state is taking place in power supply device 100 if the pattern of the combination of signals corresponds to pattern 8.

As still another configuration, information as to whether a surge has been input may be held instantly. For example, a reference voltage that is proportional to the input voltage may be generated and the power supply device may be latched if the reference voltage has exceeded, even instantly, a certain value. The LED display pattern or display mode in this case is not particularly limited. For example, the LED (e.g., input 1) may be on in a display color different from a typical display color. Similarly, power supply device 100 may have a function of sensing a momentary power interruption. In this case, the power supply device may be latched and the LED (e.g., input 1) may be on in the display color different from the typical display color if the reference voltage has decreased below a certain value even instantly.

Figure 13:
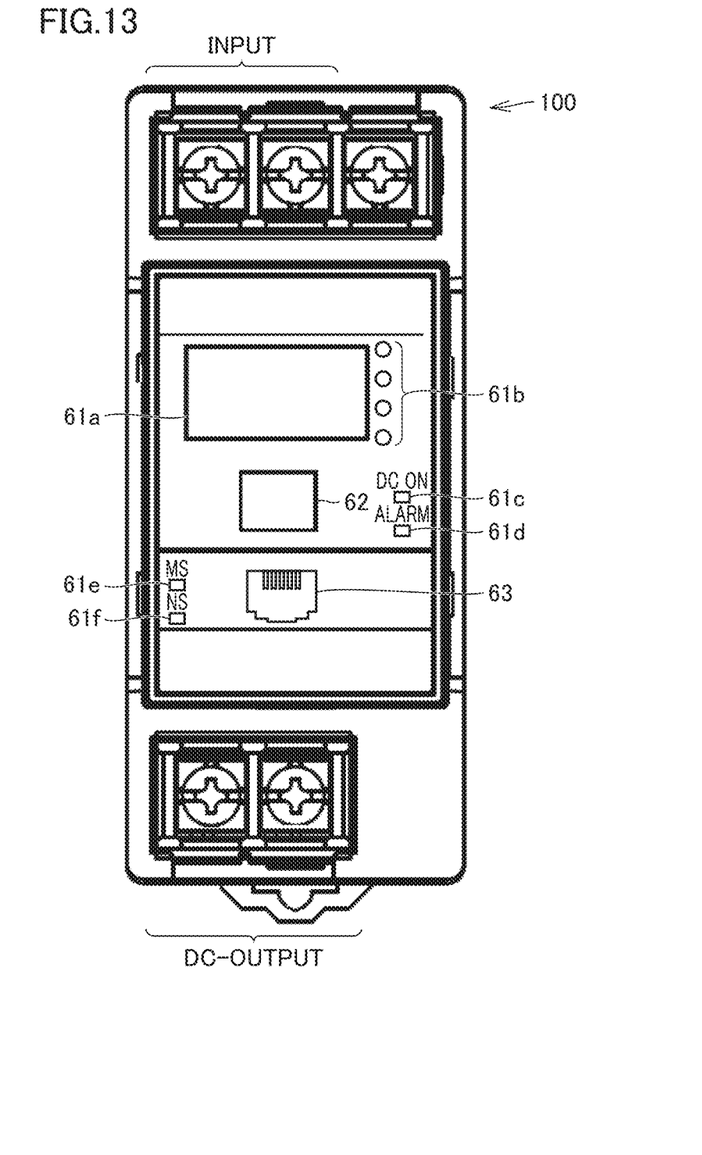
FIG. 13 is a diagram schematically showing one example of appearance of the power supply device according to the embodiment of the present invention.

FIG. 13 is a diagram schematically showing one example of appearance of the power supply device according to the embodiment of the present invention. As shown in FIG. 13, display circuits 61a to 61f, a switch 62, and a communication circuit 63 are disposed on the surface of power supply device 100 on which the terminals for INPUT and the terminals for DC-OUTPUT are provided.

Display circuit 61a is configured of a 7-segment LED, for example. Display circuit 61a may be an LCD or an organic EL display, for example. As described above, if the first output circuit, the second output circuit, the third output circuit, and the fourth output circuit respectively corresponding to "input 1," "input 2," "input 3," "output 1," are each configured of a photocoupler, the 7-segment LED can implement a display circuit which displays, through the control by the CPU, information regarding the state of power supply device 100 based on the first output, the second output, and the third output. Note that, based on the configuration shown in FIGS. 1 and 2, display circuit 61a may display the information regarding the state of power supply device 100 based on the outputs (the first output, the second output, and the third output) from the first output circuit, the second output circuit, and the third output circuit corresponding to "input 1," "input 2," and "output 1," respectively.

Display circuit 61b is configured of the LED lamps aligned on the side of display circuit 61a. The number of LED lamps is not particularly limited. For example, two LED lamps may correspond to LED 12 (input 1) and LED 13 (input 2). Alternatively, three LED lamps may correspond to LED 12 (input 1), LED 13 (input 2), and LED 51 (input 3). Display circuit 61c is configured of the LED lamp located below the display circuit 61b. The LED lamp being on indicates that the DC voltage is output from power supply device 100. Display circuit 61c may correspond to LED 31 (output 1).

Display circuit 61d may be configured of the LED lamp located below the display circuit 61c and indicate that an anomaly is occurring in power supply device 100 by turning the LED lamp on.

Display circuit 61e and display circuit 61f are configured of the two LED lamps aligned on the side of communication circuit 63. These LED lamps being on indicate a status of communication by communication circuit 63.

[Effects]

As described above, in the present embodiment, the user is allowed to visually confirm the internal state of the power supply device 100 and the state of the input voltage at least from the combinations of the outputs from three output circuits.

[Supplementary Notes]

As described above, the present embodiment includes the disclosure as follows:

1. A power supply device (100), including:
   an input unit (10) which includes an input terminal (14) and a protection circuit (11) connected to the input terminal (14);
   a power supply unit (20) that generates a supply voltage from a voltage input through the input unit (10);
   an output unit (30) which includes an output terminal (32) which outputs the supply voltage;
   a first output circuit (12) that generates a first output in response to input of a voltage to the input terminal (14), the first output circuit being disposed between the input terminal (14) and the protection circuit (11);
   a second output circuit (13) that generates a second output in response to input of a voltage to the power supply unit (20) through the protection circuit (11), the second output circuit being disposed between the protection circuit (11) and the power supply unit (20); and
   a third output circuit (31) that generates a third output in response to output from the power supply unit (20), the third output circuit being connected to the output terminal (32).

2. The power supply device (100) according to 1, wherein the first output circuit (12), the second output circuit (13), and the third output circuit (31) are light-emitting circuits, and the first output, the second output, and the third output are light outputs.

3. The power supply device (100) according to 1 or 2, wherein
   the power supply unit (20) includes:
   a transformer having a primary winding (22p), an auxiliary winding (22a), and a secondary winding (22s);
   a switching element (23) connected to the primary winding (22p) of the transformer; and
   a drive control circuit (28) that receives a voltage across the auxiliary winding (22a) of the transformer and drives the switching element (23),
   the power supply device (100) further including a fourth output circuit (31) that outputs a fourth signal indicating whether the voltage across the auxiliary winding (22a) is normal.

4. The power supply device (100) according to 3, wherein the fourth output circuit (31) is a light-emitting circuit and the fourth output is a light output.

5. The power supply device (100) according to 1, further including
   a display circuit that displays information regarding a state of the power supply device (100), based at least on the first output, the second output, and the third output.

While the embodiment according to the present invention has been described above, the embodiment presently disclosed should be considered in all aspects illustrative and not restrictive. The scope of the present invention is defined by the appended claims. All changes which come within the meaning and range of equivalency of the appended claims are to be embraced within their scope.

REFERENCE SIGNS LIST

2 DC power supply; 5 load; 10 input unit; 11 fuse; 14, 15, 16 input terminal; 17 input capacitor; 20 power supply unit; 21 rectifier circuit; 22 transformer; 22a auxiliary winding; 22p primary winding; 22s secondary winding; 23 MOSFET; 24 rectifier/smoothing circuit; 25 inrush current-limiting circuit; 26 noise filter; 28 drive control circuit; 29 overcurrent sensing circuit; 30 output unit; 32, 33 output terminal; 41 voltage sensing circuit; 42 overvoltage sensing circuit; 43, 44 photocoupler; 45, 46 capacitor; 61a to 61f display circuit; 62 switch; 63 communication circuit; and 100, 100A, 100B power supply device.

The invention claimed is:

1. A power supply device, comprising:
   an input unit which includes an input terminal and a protection circuit connected to the input terminal;
   a power supply unit that generates a supply voltage from a voltage input through the input unit;
   an output unit which includes an output terminal which outputs the supply voltage;
   a first output circuit that generates a first output in response to input of a voltage to the input terminal, the first output circuit being disposed between the input terminal and the protection circuit;
   a second output circuit that generates a second output in response to input of a voltage to the power supply unit through the protection circuit, the second output circuit being disposed between the protection circuit and the power supply unit; and
   a third output circuit that generates a third output in response to output from the power supply unit, the third output circuit being connected to the output terminal, wherein
   the first output circuit, the second output circuit, and the third output circuit are light-emitting circuits, and the first output, the second output, and the third output are light outputs,
   the first output circuit turns on in response to an input voltage exceeding a threshold voltage,
   the threshold voltage for turning on the first output circuit is higher than an operating stop voltage of the power supply unit, and a preset voltage for turning on the second output circuit is lower than the operating stop voltage of the power supply unit.

2. The power supply device according to claim 1, wherein the power supply unit includes:
   a transformer having a primary winding, an auxiliary winding, and a secondary winding;
   a switching element connected to the primary winding of the transformer; and
   a drive control circuit that receives a voltage across the auxiliary winding of the transformer and drives the switching element, the power supply device further comprising a fourth output circuit that outputs a fourth signal indicating whether the voltage across the auxiliary winding is normal.

3. The power supply device according to claim 2, wherein the fourth output circuit is a light-emitting circuit and the fourth output is a light output.

4. The power supply device according to claim 1, further comprising a display circuit that displays information regarding a state of the power supply device, based at least on the first output, the second output, and the third output.

\* \* \* \* \*